(12) United States Patent
Han et al.

(10) Patent No.: US 9,911,025 B2
(45) Date of Patent: Mar. 6, 2018

(54) SENSOR SCREEN AND DISPLAY DEVICE INCLUDING THE SAME

(71) Applicant: LG DISPLAY CO., LTD., Seoul (KR)

(72) Inventors: Manhyeop Han, Seoul (KR); Kyoseop Choo, Suwon-si (KR)

(73) Assignee: LG DISPLAY CO., LTD., Seoul (KR)

( * ) Notice: Subject to any disclaimer, the term of this patent is extended or adjusted under 35 U.S.C. 154(b) by 65 days.

(21) Appl. No.: 15/015,687

(22) Filed: Feb. 4, 2016

(65) Prior Publication Data

US 2016/0232395 A1    Aug. 11, 2016

(30) Foreign Application Priority Data

Feb. 6, 2015   (KR) .................. 10-2015-0018767

(51) Int. Cl.
  *G06K 9/00* (2006.01)
  *G06F 3/048* (2013.01)

(52) U.S. Cl.
  CPC .......... *G06K 9/0002* (2013.01); *G06F 3/048* (2013.01)

(58) Field of Classification Search
  CPC .. G06K 9/0002; G06K 9/00006; G06F 3/044; G06F 1/16; H05K 1/0281; H05K 1/0296
  USPC ...................................................... 382/124
  See application file for complete search history.

(56) References Cited

U.S. PATENT DOCUMENTS

| 9,207,720 | B2 * | 12/2015 | Kang | ........ G06F 1/1643 |
| 9,396,379 | B2 * | 7/2016 | Slogedal | ........ G06K 9/0002 |
| 2009/0225045 | A1 * | 9/2009 | Liu | ........ G06F 3/0412 345/173 |
| 2013/0307818 | A1 | 11/2013 | Pope et al. | |
| 2015/0177884 | A1 * | 6/2015 | Han | ........ G06F 3/044 345/174 |
| 2015/0227170 | A1 * | 8/2015 | Kim | ........ G06F 1/1643 345/174 |

* cited by examiner

*Primary Examiner* — Daniel Mariam
(74) *Attorney, Agent, or Firm* — Birch, Stewart, Kolasch & Birch, LLP (57) ABSTRACT

A sensor screen and a display device including the same are described. The sensor screen can include a first base member including a first active area and a first bezel area and having a first thickness, a second base member which is positioned opposite the first base member and has a second thickness less than the first thickness, and at least one fingerprint sensor disposed in a portion of the first bezel area of one of the first and second base members. The fingerprint sensor can include a plurality of first fingerprint electrodes arranged in a first direction and a plurality of second fingerprint electrodes, which are insulated from the first fingerprint electrodes and are arranged in a second direction crossing the first direction.

16 Claims, 8 Drawing Sheets

SENSOR SCREEN AND DISPLAY DEVICE INCLUDING THE SAME

This application claims the priority benefit of Korean Patent Application No. 10-2015-0018767 filed on Feb. 6, 2015, which is incorporated herein by reference for all purposes as if fully set forth herein.

BACKGROUND OF THE INVENTION

Field of the Invention

The present disclosure relates to a sensor screen and a display device including the same, and more particularly to a sensor screen having a fingerprint recognition function and a display device including the same.

Discussion of the Related Art

With the development of computer technology, computer based systems applied to various utilities, such as notebook computers, tablet personal computers (PCs), smart phones, personal digital assistants (PDAs), automated teller machines (ATMs), and information systems have been developed. In general, the computer based systems store various data including secret information such as business information and business secret as well as personal information related to private affairs. Thus, it is required to strengthen security to protect the secret information.

To this end, fingerprint sensors have been developed to strengthen security by performing registration or certification of systems using fingerprints of human beings.

The fingerprint sensor is a sensor capable of sensing fingerprints of human beings. The fingerprint sensor is classified into an optical fingerprint sensor and a capacitive fingerprint sensor.

The optical fingerprint sensor utilizes a principle in which a light source, such as a light emitting diode (LED), emits light and senses the light reflected from ridges and valleys of a fingerprint through a CMOS image sensor. There are, however, some problems such as an increase in size due to the use of LEDs and a rise in product cost due to the use of expensive light source.

The capacitive fingerprint sensor utilizes a difference of electric charges charged between ridges and valley of the finger contacted thereto.

U.S. Patent Publication No. 2013/0307818 published on Nov. 21, 2013, and entitled "Capacitive Sensor Package" describes a related art capacitive fingerprint sensor.

The published capacitive fingerprint sensor is configured as an assembly form coupled with a particular push button. The capacitive fingerprint sensor includes a silicon wafer, on which a circuit for measuring a capacitance between the fingerprint (ridges and valleys) and a capacitive plate is printed.

In general, it is necessary for the capacitive fingerprint sensor described in US Patent Publication No. 2013/0307818 to have a high resolution sensor array and an integrated circuit (IC) for the fingerprint recognition processing because the finger's ridges and valleys have a very minute size of about 300 µm to about 500 µm. To this end, the capacitive fingerprint sensor utilizes the silicon wafer for integrating the IC with the sensor array.

However, in case of integrating the IC with the high resolution sensor array using the silicon wafer, it is necessary for the capacitive fingerprint sensor to have an assembly construction for coupling the fingerprint sensor with a push button. Accordingly, there are some problems such as a complicated construction and an increase in a non-display area (e.g., bezel area) in the optical fingerprint sensor due to the assembly construction. Also, there are other problems including the issue where the thickness is increased and an area for sensing the fingerprint depends on the size of the push button (e.g., a home key of a smart phone) because the push button overlaps the fingerprint sensor.

SUMMARY OF THE INVENTION

The present disclosure provides a sensor screen and a display device including the same capable of addressing problems and limitations associated with the related art capacitive fingerprint sensors.

In one aspect of the invention, there is provided a sensor screen comprising a first base member including a first active area and a first bezel area and having a first thickness, a second base member positioned opposite the first base member, and having a second thickness less than the first thickness, and at least one fingerprint sensor disposed in a portion of the first bezel area of one of the first and second base members which are positioned opposite each other, the at least one fingerprint sensor including a plurality of first fingerprint electrodes arranged in a first direction and a plurality of second fingerprint electrodes, which are insulated from the plurality of first fingerprint electrodes and are arranged in a second direction crossing the first direction.

The sensor screen may further comprise a first flexible printed circuit board disposed at one edge of the first bezel area adjacent to the portion of the first bezel area, the first flexible printed circuit board including a fingerprint integrated circuit (IC) connected to ends of the plurality of first and second fingerprint electrodes A touch array including a plurality of touch electrodes may be disposed in the first active area.

The sensor screen may further comprise a second flexible printed circuit board disposed at the other edge opposite the one edge of the first bezel area, the second flexible printed circuit board including a touch IC connected to ends of the plurality of touch electrodes.

The first base member may further include a groove receiving the fingerprint IC.

A plurality of via holes a fingerprint IC connected to the plurality of first and second fingerprint wires may be disposed on another surface of the first base member opposite one surface of the first base member, which faces the second base member. A fingerprint IC connected to the plurality of first and second fingerprint wires may be disposed on another surface of the first base member opposite one surface of the first base member, which faces the second base member.

The sensor screen may further comprise at least one touch sensor separated from the at least one fingerprint sensor in the portion of the first bezel area.

At least one flexible printed circuit board may be disposed at one edge of the first bezel area adjacent to the portion of the first bezel area, and a fingerprint-touch IC connected to ends of the plurality of first and second fingerprint electrodes is mounted on the at least one flexible printed circuit board.

In another aspect, there is provided a sensor screen comprising a first base member including a first active area and a first bezel area and having a first thickness, a second base member positioned opposite the first base member, and having a second thickness less than the first thickness, at least one fingerprint sensor disposed in a portion of the first active area of one of the first and second base members which are positioned opposite each other, the at least one fingerprint sensor including a plurality of first fingerprint electrodes arranged in a first direction and a plurality of second fingerprint electrodes, which are insulated from the plurality of first fingerprint electrodes and are arranged in a second direction crossing the first direction, and at least one touch sensor configured to alternate with the at least one fingerprint sensor in the portion of the first active area.

In yet another aspect, there is provided a display comprising a display panel including an active area in which an image is displayed, and a bezel area disposed outside the active area and a sensor screen disposed on the display panel, the sensor screen having the above-described configurations, wherein the first base member is disposed on the display panel, and the portion of the first bezel area, in which the at least one fingerprint sensor is disposed, corresponds to the bezel area of the display panel.

According to the sensor screen and the display device including the same according to various examples of the present disclosure, the fingerprint sensor is disposed in a portion of the first bezel area of the first base member or the second base member, and the fingerprint IC for the fingerprint sensing is disposed in the flexible printed circuit board. Therefore, an assembly structure for coupling the fingerprint sensor with a push button is unnecessary, and a design limit required to integrate a sensor array with the fingerprint IC can be removed. Hence, an effect of removing a limit to the size and the formation location of the fingerprint sensor can be obtained.

Further, the first and second fingerprint electrodes are disposed on an upper surface of the first base member or a lower surface of the second base member, and the thickness of the second base member positioned on the first base member is less than the thickness of the first base member. Therefore, the sensing sensitivity of the fingerprint sensor can increase.

Further, both the first and second base members may be formed of tempered glass. Alternatively, the first base member may be formed of tempered glass, and the second base member may be formed of hard-coated high-hardness plastic. Therefore, the sensor screen having a sufficient strength can be obtained.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention. Names of components used in the following description may be selected in consideration of facility of specification preparation. Thus, the names of the components may be different from names of components used in real products.

Figure 1:
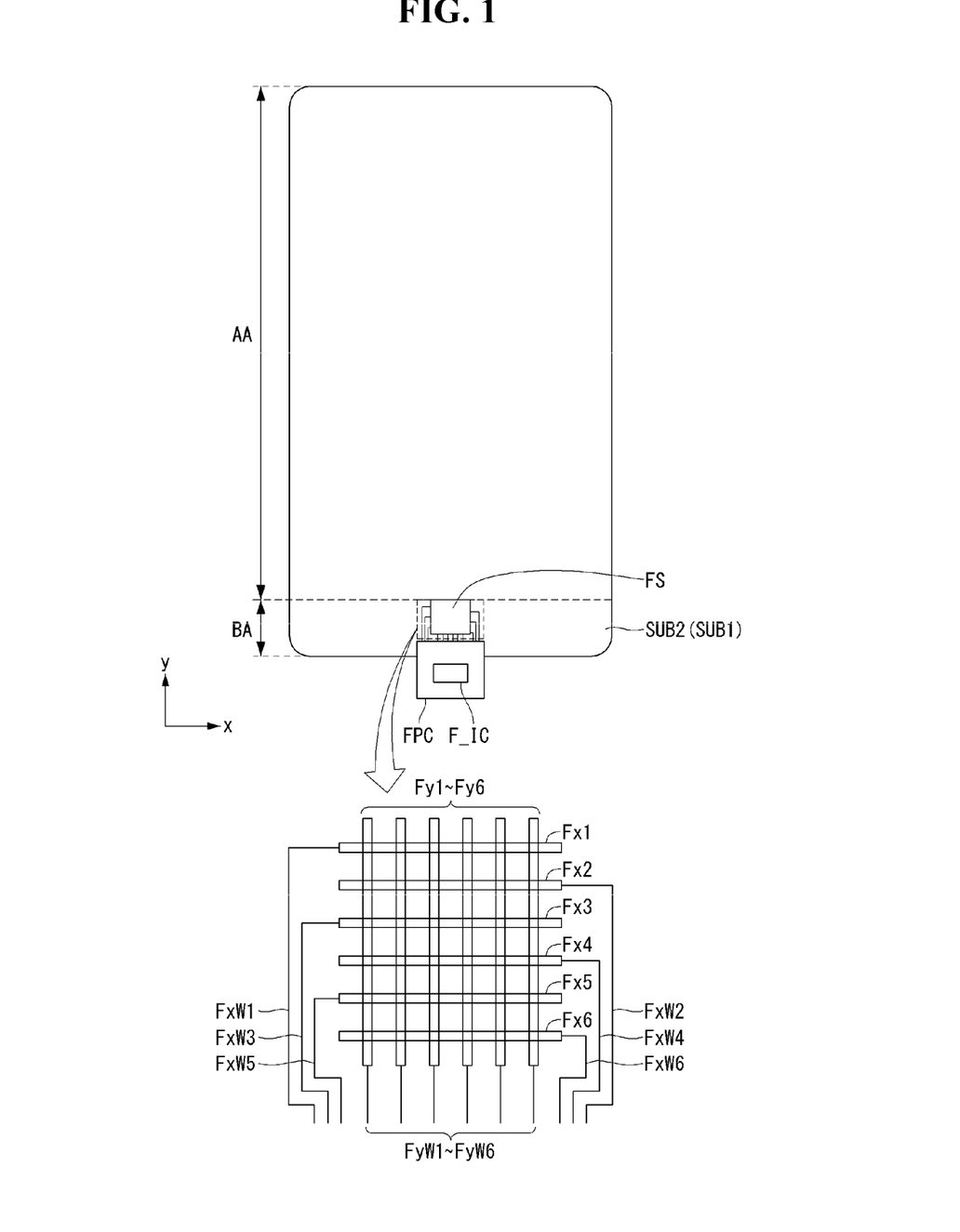
FIG. 1 is a plan view illustrating a sensor screen according to a first embodiment of the invention.

A sensor screen according to a first embodiment of the invention is described with reference to FIG. 1. FIG. 1 is a plan view illustrating a sensor screen according to the first embodiment of the invention. All the components of the sensor screen according to all embodiments of the invention are operatively coupled and configured.

Referring to FIG. 1, the sensor screen according to the first embodiment of the invention includes a first base member SUB1 and a second base member SUB2 which are positioned opposite each other and attached to each other. The sensor screen may further include a flexible printed circuit board FPC, of which one end is disposed at one end of the sensor screen.

The first base member SUB1 has a first thickness, and the second base member SUB2 has a second thickness less than the first thickness. The first and second base members SUB1 and SUB2 may be formed of a transparent material, for example, tempered glass and hard-coated high-hardness plastic.

A fingerprint recognition rate increases as a difference between capacitances of ridges and valleys of a fingerprint increases. Thus, when the thickness of the second base member SUB2 excessively increases, a blurring phenomenon is generated in a fingerprint image formed by the ridges and the valleys of the fingerprint when recognizing the fingerprint. Hence, the fingerprint recognition rate decreases. Thus, it is preferable, but not required, that the thickness of the second base member SUB2 is set to several µm to about 0.3 mm so as to increase the fingerprint recognition rate. When the thickness of the second base member SUB2 is less than several µm, rigidity of the second base member SUB2 is not sufficiently secured. Hence, a fingerprint sensor formed under the second base member SUB2 is not sufficiently protected. When the thickness of the second base member SUB2 exceeds 0.3 mm, the fingerprint recognition rate decreases.

Each of the first base member SUB1 and the second base member SUB2 includes a first active area AA and a first bezel area BA disposed outside the first active area AA. The first active area AA and the first bezel area BA of the first base member SUB1 are positioned correspondingly to the first active area AA and the first bezel area BA of the second base member SUB2.

A fingerprint sensor FS is disposed in the first bezel area BA of one of the first and second base members SUB1 and SUB2. The first embodiment of the invention describes that the fingerprint sensor FS is disposed in the first bezel area BA of an upper surface of the first base member SUB1 opposite the second base member SUB2, and the second base member SUB2 is attached to the upper surface of the first base member SUB1, but is not limited thereto. For example, the first embodiment of the invention may be configured such that the fingerprint sensor FS is disposed in the first bezel area BA of a lower surface of the second base member SUB2 opposite the first base member SUB1, and the first base member SUB1 is attached to the lower surface of the second base member SUB2.

The fingerprint sensor FS is disposed in a portion of the first bezel area BA. The fingerprint sensor FS includes a plurality of first fingerprint electrodes Fx1 to Fx6, which are arranged in the portion of the first bezel area BA in a first direction (for example, x-axis direction), and a plurality of second fingerprint electrodes Fy1 to Fy6, which are arranged in a second direction (for example, y-axis direction) crossing the first direction. The first fingerprint electrodes Fx1 to Fx6 and the sea second fingerprint electrodes Fy1 to Fy6 may be insulated from each other with an insulating layer interposed therebetween. Alternatively, an insulating pattern may be disposed only at each crossing of the first fingerprint electrodes Fx1 to Fx6 and the second fingerprint electrodes Fy1 to Fy6 and may insulate the first fingerprint electrodes Fx1 to Fx6 from the second fingerprint electrodes Fy1 to Fy6.

The first and second fingerprint electrodes Fx1 to Fx6 and Fy1 to Fy6 may be formed using a transparent conductive material, such as ITO (indium tin oxide), IZO (indium zinc oxide), and GZO (gallium-doped zinc oxide), chromium oxide having a low reflectance, or blackening metal material, for example, molybdenum (Mo). Alternatively, one of the first and second fingerprint electrodes may be formed of the transparent conductive material, and the other may be formed of metal material.

The insulating layer or the insulating pattern may be formed of inorganic insulating material, such as silicon oxide and silicon nitride, or a photosensitive organic insulating material, such as PAC.

The first fingerprint electrodes Fx1 to Fx6 and the second fingerprint electrodes Fy1 to Fy6 each have a pitch of about 50 μm to 100 μm and a width of about 5 μm to 50 μm.

In the first bezel area BA, a plurality of first fingerprint wires FxW1 to FxW6 respectively connected to the plurality of first fingerprint electrodes Fx1 to Fx6 and a plurality of second fingerprint wires FyW1 to FyW6 respectively connected to respective one ends of the plurality of second fingerprint electrodes Fy1 to Fy6 are disposed. The plurality of first fingerprint wires FxW1 to FxW6 include 1-1 fingerprint wires FxW1, FxW3, and FxW5 respectively connected to respective one ends of the odd-numbered first fingerprint electrodes Fx1, Fx3, and Fx5 at one side of the fingerprint sensor FS and 1-2 fingerprint wires FxW2, FxW4, and FxW6 respectively connected to the other ends of the even-numbered first fingerprint electrodes Fx2, Fx4, and Fx6 at the other side of the fingerprint sensor FS.

The first embodiment of the invention describes that the 1-1 fingerprint wires FxW1, FxW3, and FxW5 among the plurality of first fingerprint wires FxW1 to FxW6 are respectively connected to the one ends of the odd-numbered first fingerprint electrodes Fx1, Fx3, and Fx5, and the 1-2 fingerprint wires FxW2, FxW4, and FxW6 are respectively connected to the other ends of the even-numbered first fingerprint electrodes Fx2, Fx4, and Fx6, but is not limited thereto. For example, the first embodiment of the invention may be configured such that the plurality of first fingerprint wires FxW1 to FxW6 are respectively connected to respective one ends of the plurality of first fingerprint electrodes Fx1 to Fx6. Alternatively, the first embodiment of the invention may be configured such that some (for example, FxW1 to FxW3) of the first fingerprint wires are respectively connected to one ends of some (for example, Fx1 to Fx3) of the first fingerprint electrodes, and the remaining first fingerprint wires (for example, FxW4 to FxW6) are respectively connected to the other ends of the remaining first fingerprint electrodes (for example, Fx4 to Fx6).

The flexible printed circuit board FPC includes a fingerprint integrated circuit (IC) F_IC connected to the plurality of first fingerprint wires FxW1 to FxW6 through a plurality of flexible fingerprint wires. The fingerprint IC F_IC supplies a driving pulse to one (for example, the first fingerprint electrodes Fx1 to Fx6 or the second fingerprint electrodes Fy1 to Fy6) of the first fingerprint electrodes Fx1 to Fx6 and the second fingerprint electrodes Fy1 to Fy6 and senses changes in capacitances of ridges and valleys of a user's fingerprint in accordance with a touch operation using user's finger through the other (for example, the second fingerprint electrodes Fy1 to Fy6 or the first fingerprint electrodes Fx1 to Fx6), thereby recognizing the user's fingerprint.

In the sensor screen according to the first embodiment of the invention, the fingerprint sensor FS is disposed in the portion of the first bezel area BA of the first base member SUB1 or the second base member SUB2, and the fingerprint IC F_IC for the fingerprint sensing is disposed in the flexible printed circuit board FPC. Therefore, an assembly structure for coupling the fingerprint sensor FS with a push button is unnecessary, and a design limit required to integrate a sensor array with the fingerprint IC can be removed. Hence, an effect of removing a limit to the size and the formation location of the fingerprint sensor FS can be obtained.

The first and second fingerprint electrodes are disposed on the upper surface of the first base member SUB1 or the lower surface of the second base member SUB2, and the thickness of the second base member SUB2 positioned on the first base member SUB1 is less than the thickness of the first base member SUB1. Therefore, the sensing sensitivity of the fingerprint sensor FS can increase.

Both the first and second base members SUB1 and SUB2 may be formed of tempered glass. Alternatively, the first base member SUB1 may be formed of tempered glass, and the second base member SUB2 may be formed of hard-coated high-hardness plastic. Therefore, the sensor screen having a sufficient strength can be obtained.

Figure 2:
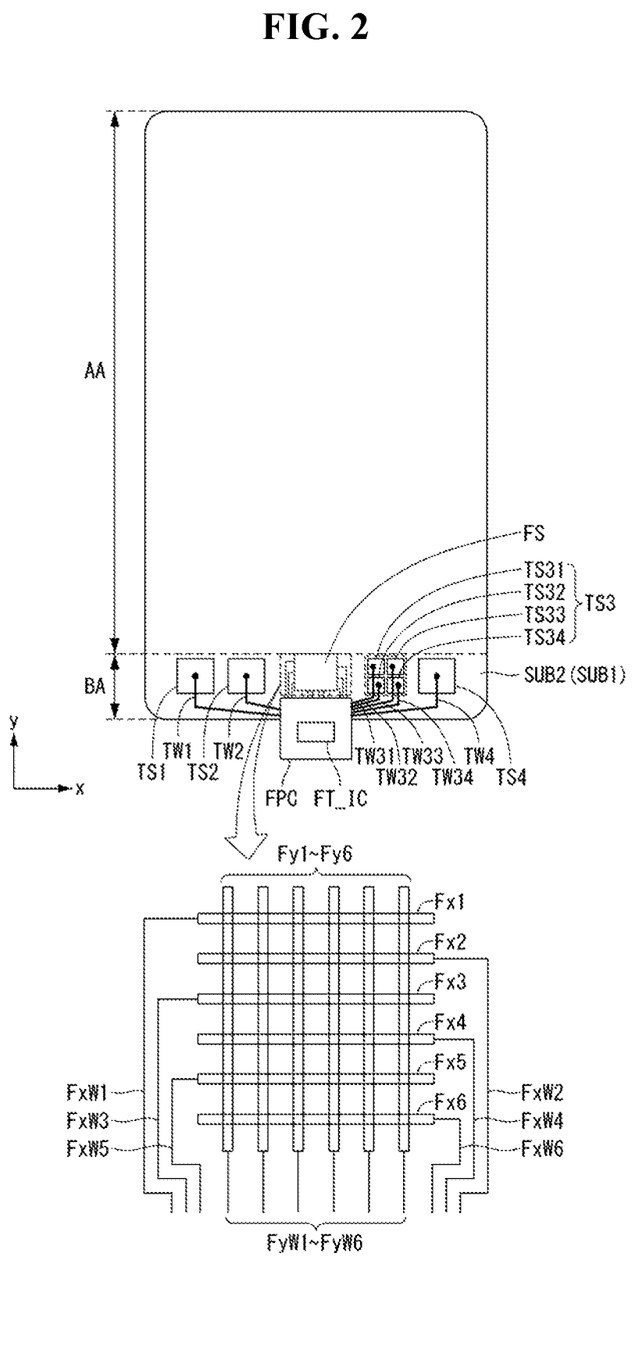
FIG. 2 is a plan view illustrating a sensor screen according to a second embodiment of the invention.

Next, a sensor screen according to a second embodiment of the invention is described with reference to FIG. 2. FIG. 2 is a plan view illustrating a sensor screen according to the second embodiment of the invention.

Referring to FIG. 2, the sensor screen according to the second embodiment of the invention is substantially the same as the sensor screen according to the first embodiment of the invention, except that touch sensors are additionally disposed in a first bezel area. Therefore, the repeated description is omitted, and only a configuration of the second embodiment of the invention different from the first embodiment of the invention is described.

A fingerprint sensor FS and one or more touch sensors TS1 to TS4 are disposed in a first bezel area BA of the sensor screen.

In the sensor screen according to the second embodiment of the invention, the first and second touch sensors TS1 and TS2 are disposed at one side of the fingerprint sensor FS, and the third and fourth touch sensors TS3 and TS4 are disposed at the other side of the fingerprint sensor FS. Other arrangements may be used for the touch sensors TS1 to TS4. For example, the fingerprint sensor FS may lean to one side of the first bezel area BA, and the first to fourth touch sensors TS1 to TS4 may be disposed at a predetermined distance therebetween in a remaining portion of the first bezel area BA.

The touch sensors disposed in the first bezel area BA may have the same size. Alternatively, the touch sensors may have different sizes. Alternatively, at least one of the touch sensors may be divided into several parts and may have the smaller size than the remaining touch sensors. For example, as shown in FIG. 2, the first, second, and fourth touch sensors TS1, TS2, and TS4 may have the same size, and the third touch sensor TS3 may be divided into several parts and may have the smaller size than the first, second, and fourth touch sensors TS1, TS2, and TS4.

The first bezel area BA includes 1-1 fingerprint wires FxW1, FxW3, and FxW5 respectively connected to respective one ends of odd-numbered first fingerprint electrodes Fx1, Fx3, and Fx5 at one side of the fingerprint sensor FS, 1-2 fingerprint wires FxW2, FxW4, and FxW6 respectively connected to the other ends of even-numbered first fingerprint electrodes Fx2, Fx4, and Fx6 at the other side of the fingerprint sensor FS, and second fingerprint wires FyW1 to FyW6 respectively connected to second fingerprint electrodes Fy1 to Fy6.

The first bezel area BA includes a first touch wire TW1 connected to the first touch sensor TS1, a second touch wire TW2 connected to the second touch sensor TS2, and a fourth touch wire TW4 connected to the fourth touch sensor TS4. The first bezel area BA includes a 3-1 touch wire TW31 connected to a 3-1 touch sensor TS31 of the third touch sensor TS3, a 3-2 touch wire TW32 connected to a 3-2 touch sensor TS32 of the third touch sensor TS3, a 3-3 touch wire TW33 connected to a 3-3 touch sensor TS33 of the third touch sensor TS3, and a 3-4 touch wire TW34 connected to a 3-4 touch sensor TS34 of the third touch sensor TS3.

A flexible printed circuit board FPC includes a fingerprint-touch IC FT_IC connected to the plurality of first fingerprint wires FxW1 to FxW6 and the first to fourth touch wires TW1, TW2, TW31-TW34, and TW4 through a plurality of flexible fingerprint-touch wires. The fingerprint-touch IC FT_IC supplies a driving pulse to one of the first fingerprint electrodes Fx1 to Fx6 and the second fingerprint electrodes Fy1 to Fy6 and senses changes in capacitances of ridges and valleys of a user's fingerprint in accordance with a touch operation using user's finger through the other fingerprint electrodes, thereby recognizing the user's fingerprint. Further, the fingerprint-touch IC FT_IC supplies the driving pulse to the first to fourth touch sensors TS1 to TS4 and then senses the first to fourth touch sensors TS1 to TS4, thereby measuring changes in capacitances depending on the touch operation and determining a touch location.

Because the sensor screen according to the second embodiment of the invention forms at least one touch sensor in a portion of the first bezel area BA, in which the fingerprint sensor FS is not formed, the sensor screen according to the second embodiment of the invention can perform other additional functions when touching the touch sensor, in addition to the effect of being obtained from the sensor screen according to the first embodiment of the invention.

Figure 3:
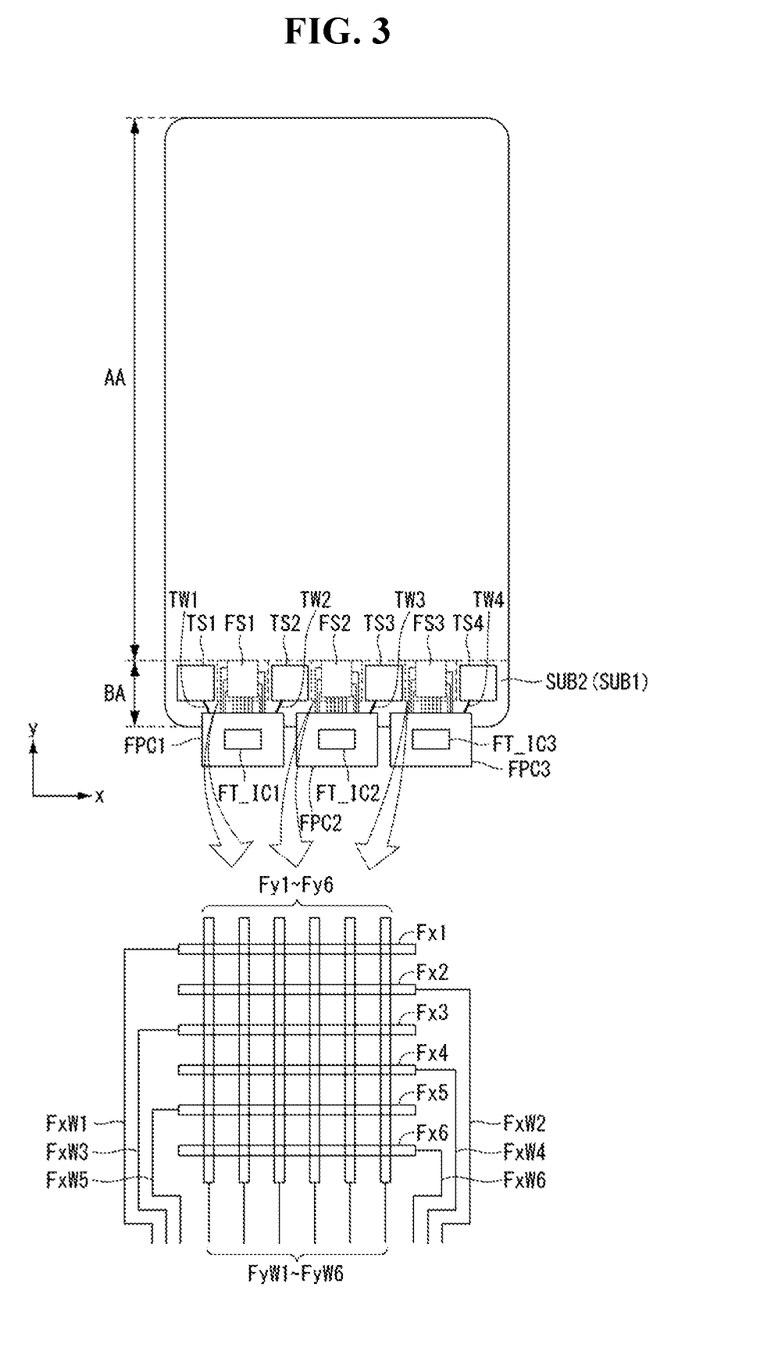
FIG. 3 is a plan view illustrating a sensor screen according to a third embodiment of the invention.

Next, a sensor screen according to a third embodiment of the invention is described with reference to FIG. 3. FIG. 3 is a plan view illustrating a sensor screen according to the third embodiment of the invention.

Referring to FIG. 3, the sensor screen according to the third embodiment of the invention is substantially the same as the sensor screen according to the first embodiment of the invention, except that a plurality of fingerprint sensors and a plurality of touch sensors are disposed in a first bezel area, and a plurality of fingerprint-touch ICs are disposed in a plurality of flexible printed circuit boards. Therefore, the repeated description is omitted, and only a configuration of the third embodiment of the invention different from the first embodiment of the invention is described.

In a first bezel area BA of the sensor screen, a plurality of fingerprint sensors FS1 to FS3 and a plurality of touch sensors TS1 to TS4 are disposed. More specifically, the plurality of fingerprint sensors FS1 to FS3 and the plurality of touch sensors TS1 to TS4 are alternately disposed in the first bezel area BA.

Each of the plurality of fingerprint sensors FS1 to FS3 includes a plurality of first fingerprint electrodes Fx1 to Fx6 and a plurality of second fingerprint electrodes Fy1 to Fy6 in the same manner as the first embodiment of the invention.

Fingerprint wires connected to each of the fingerprint sensors FS1 to FS3 are disposed in the first bezel area BA in the same manner as the first embodiment of the invention. More specifically, the fingerprint wires disposed in the first bezel area BA include 1-1 fingerprint wires FxW1, FxW3, and FxW5 respectively connected to respective one ends of odd-numbered first fingerprint electrodes Fx1, Fx3, and Fx5 at one side of each of the first to third fingerprint sensors FS1 to FS3, 1-2 fingerprint wires FxW2, FxW4, and FxW6 respectively connected to the other ends of even-numbered first fingerprint electrodes Fx2, Fx4, and Fx6 at the other side of each of the first to third fingerprint sensors FS1 to FS3, and second fingerprint wires FyW1 to FyW6 respectively connected to the second fingerprint electrodes Fy1 to Fy6 of each of the first to third fingerprint sensors FS1 to FS3.

In the first bezel area BA, touch wires TW1 to TW4 respectively connected to the plurality of touch sensors TS1 to TS4 are disposed. More specifically, the first touch wire TW1 is connected to the first touch sensor TS1, the second touch wire TW2 is connected to the second touch sensor TS2, the third touch wire TW3 is connected to the third touch sensor TS3, and the fourth touch wire TW4 is connected to the fourth touch sensor TS4.

A flexible printed circuit board includes a plurality of flexible printed circuit boards FPC1, FPC2, and FPC3 connected to the plurality of fingerprint sensors FS1 to FS3 and the plurality of touch sensors TS1 to TS4. More specifically, the first flexible printed circuit board FPC1 includes a first fingerprint-touch IC FT_IC1 connected to the first and second touch wires TW1 and TW2 and the first fingerprint wires FxW1 to FxW6 through a plurality of flexible fingerprint-touch wires. The second flexible printed circuit board FPC2 includes a second fingerprint-touch IC FT_IC2 connected to the third touch wire TW3 and the first fingerprint wires FxW1 to FxW6 through a plurality of flexible fingerprint-touch wires. The third flexible printed circuit board FPC3 includes a third fingerprint-touch IC FT_IC3 connected to the fourth touch wire TW4 and the first fingerprint wires FxW1 to FxW6 through a plurality of flexible fingerprint-touch wires.

The sensor screen according to the third embodiment of the invention can more simply perform an operation for the fingerprint recognition and also can perform other additional functions using the touch sensor by alternately disposing the plurality of fingerprint sensors and the plurality of touch sensors in the first bezel area, in addition to the effect of being obtained from the sensor screen according to the first embodiment of the invention.

Figure 4:
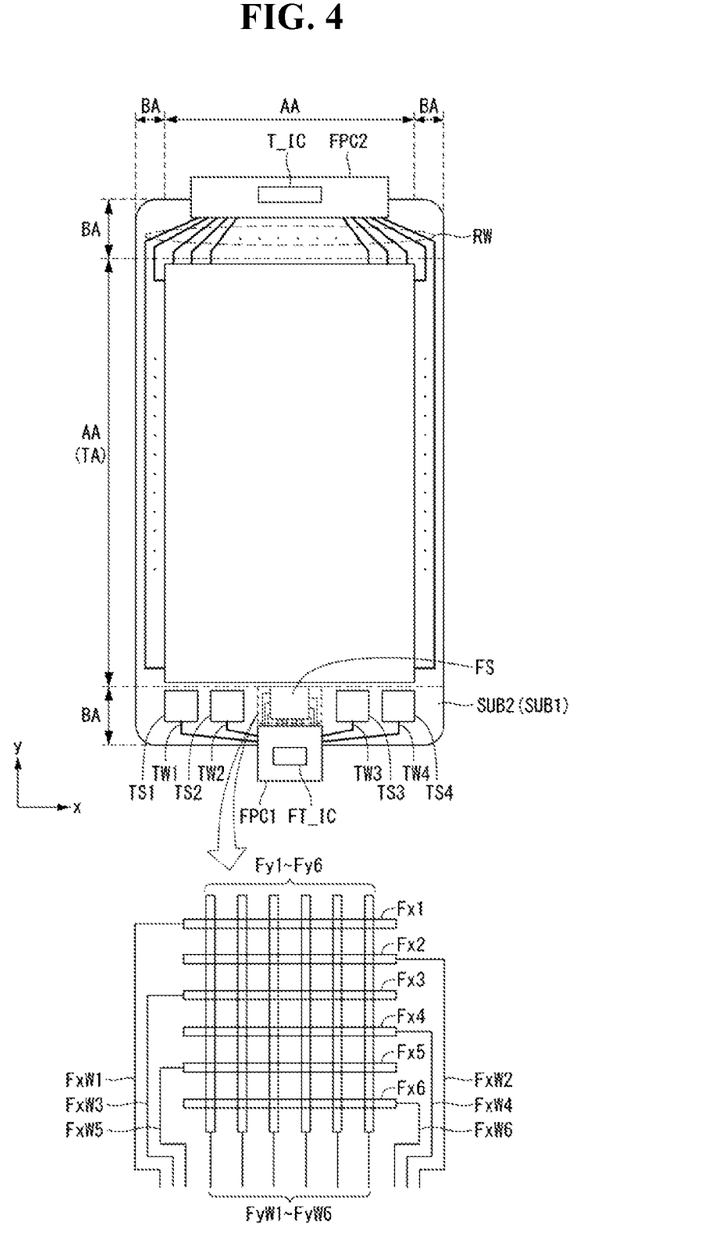
FIG. 4 is a plan view illustrating a sensor screen according to a fourth embodiment of the invention.

Next, a sensor screen according to a fourth embodiment of the invention is described with reference to FIG. 4. FIG. 4 is a plan view illustrating a sensor screen according to the fourth embodiment of the invention.

Referring to FIG. 4, the sensor screen according to the fourth embodiment of the invention is substantially the same as the sensor screen according to the first embodiment of the invention, except that a touch array is disposed in a first active area, and at least one fingerprint sensor and at least one touch sensor are disposed in a first bezel area. Therefore, the repeated description is omitted, and only a configuration of the fourth embodiment of the invention different from the first embodiment of the invention is described.

A touch array TA is disposed in a first active area AA. The touch array TA includes a plurality of touch electrodes for the touch sensing. The touch array TA may be configured as well-known mutual capacitive touch electrodes or well-known self-capacitive touch electrodes.

At least one fingerprint sensor (for example, FS1 to FS3 in FIG. 3) and at least one touch sensor (for example, TS1 to TS4 in FIG. 3) are disposed at one side of a first bezel area BA. Further, 1-1 fingerprint wires FxW1, FxW3, and FxW5 respectively connected to respective one ends of odd-numbered first fingerprint electrodes Fx1, Fx3, and Fx5 of the fingerprint sensor FS, 1-2 fingerprint wires FxW2, FxW4, and FxW6 respectively connected to the other ends of even-numbered first fingerprint electrodes Fx2, Fx4, and Fx6 of the fingerprint sensor FS, second fingerprint wires FyW1 to FyW6 respectively connected to second fingerprint electrodes Fy1 to Fy6 of the fingerprint sensor FS, and first to fourth touch wires TW1 to TW4 respectively connected to first to fourth touch sensors TS1 to TS4 are disposed at one side of the first bezel area BA.

Routing wires RW connected to the touch electrodes of the touch array TA are disposed at the other side of the first bezel area BA.

A flexible printed circuit board includes a first flexible printed circuit board FPC1 disposed at one end of the first bezel area BA and a second flexible printed circuit board FPC2 disposed at the other end of the first bezel area BA.

The first flexible printed circuit board FPC1 includes a fingerprint-touch IC FT_IC which is connected to the first and second fingerprint wires FxW1 to FxW6 and FyW1 to FyW6 through a plurality of flexible fingerprint wires and is connected to the first to fourth touch wires TW1 to TW4 through a plurality of flexible touch wires.

The second flexible printed circuit board FPC2 includes a touch IC T_IC connected to the routing wires RW through a plurality of flexible routing wires.

Because the sensor screen according to the fourth embodiment of the invention forms at least one touch sensor in a portion of the first bezel area BA, in which the fingerprint sensor FS is not formed, and forms the touch array in the first active area AA, the sensor screen according to the fourth embodiment of the invention can perform other additional functions through the touch sensor and the touch array, in addition to the effect capable of being obtained from the sensor screen according to the first embodiment of the invention.

Figure 5:
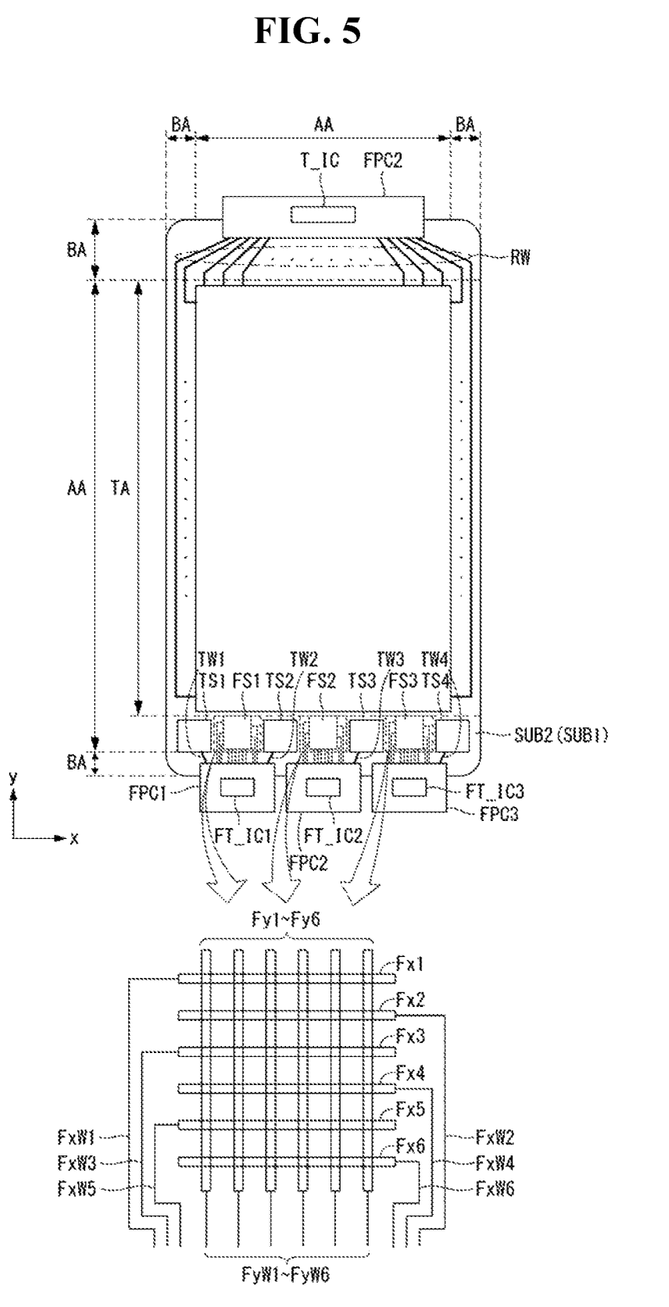
FIG. 5 is a plan view illustrating a sensor screen according to a fifth embodiment of the invention.

Next, a sensor screen according to a fifth embodiment of the invention is described with reference to FIG. 5. FIG. 5 is a plan view illustrating a sensor screen according to the fifth embodiment of the invention.

Referring to FIG. 5, the sensor screen according to the fifth embodiment of the invention is substantially the same as the sensor screen according to the third embodiment of the invention, except that a plurality of fingerprint sensors and a plurality of touch sensors are disposed in a first bezel area, and a touch array is disposed in a first active area. Therefore, the repeated description is omitted, and only a configuration of the fifth embodiment of the invention different from the third embodiment of the invention is described.

A plurality of fingerprint sensors FS1 to FS3 and a plurality of touch sensors TS1 to TS4 are disposed at one side of a first active area AA of the sensor screen. More specifically, the plurality of fingerprint sensors FS1 to FS3 and the plurality of touch sensors TS1 to TS4 are alternately disposed.

Each of the plurality of fingerprint sensors FS1 to FS3 includes a plurality of first fingerprint electrodes Fx1 to Fx6 and a plurality of second fingerprint electrodes Fy1 to Fy6 in the same manner as the first embodiment of the invention.

Fingerprint wires connected to each of the fingerprint sensors FS1 to FS3 are disposed in a first bezel area BA in the same manner as the first embodiment of the invention. A portion of the fingerprint wires may extend from the first active area AA to the first bezel area BA. More specifically, the fingerprint wires disposed in the first bezel area BA include 1-1 fingerprint wires FxW1, FxW3, and FxW5, which are respectively connected to respective one ends of odd-numbered first fingerprint electrodes Fx1, Fx3, and Fx5 at one side of each of the first to third fingerprint sensors FS1 to FS3 and extend from the first active area AA to the first bezel area BA, and 1-2 fingerprint wires FxW2, FxW4, and FxW6, which are respectively connected to the other ends of even-numbered first fingerprint electrodes Fx2, Fx4, and Fx6 at the other side of each of the first to third fingerprint sensors FS1 to FS3 and extend from the first active area AA to the first bezel area BA.

In the first bezel area BA, touch wires TW1 to TW4 respectively connected to the plurality of touch sensors TS1 to TS4 are disposed. The touch wires TW1 to TW4 may be respectively connected to the touch sensors TS1 to TS4 in the first active area AA and may extend to the first bezel area BA. More specifically, the first touch wire TW1 is connected to the first touch sensor TS1, the second touch wire TW2 is connected to the second touch sensor TS2, the third touch wire TW3 is connected to the third touch sensor TS3, and the fourth touch wire TW4 is connected to the fourth touch sensor TS4.

A touch array TA is disposed on the upper side of the first active area AA, in which the touch sensors TS1 to TS4 and the fingerprint sensors FS1 to FS3 are disposed. The touch array TA includes a plurality of touch electrodes for the touch sensing. The touch array TA may be configured as well-known mutual capacitive touch electrodes or well-known self-capacitive touch electrodes.

At least one fingerprint sensor (for example, FS1 to FS3 in FIG. 5) and at least one touch sensor (for example, TS1 to TS4 in FIG. 5) are disposed at one side of the first bezel area BA. Further, the 1-1 fingerprint wires FxW1, FxW3, and FxW5 respectively connected to respective one ends of the odd-numbered first fingerprint electrodes Fx1, Fx3, and Fx5 of each of the first to third fingerprint sensors FS1 to FS3, the 1-2 fingerprint wires FxW2, FxW4, and FxW6 respectively connected to the other ends of the even-numbered first fingerprint electrodes Fx2, Fx4, and Fx6 of each of the first to third fingerprint sensors FS1 to FS3, second fingerprint wires FyW1 to FyW6 respectively connected to the second fingerprint electrodes Fy1 to Fy6 of each of the first to third fingerprint sensors FS1 to FS3, and the first to fourth touch wires TW1 to TW4 respectively connected to the first to fourth touch sensors TS1 to TS4 are disposed at one side of the first bezel area BA.

Routing wires RW connected to the touch electrodes of the touch array TA are disposed at the other side of the first bezel area BA.

A flexible printed circuit board includes 1-1 to 1-3 flexible printed circuit boards FPC1 to FPC3 disposed at one end of the first bezel area BA and a second flexible printed circuit board FPC2 disposed at the other end of the first bezel area BA. The 1-1 to 1-3 flexible printed circuit boards FPC1 to FPC3 and the second flexible printed circuit board FPC2 each are connected to one fingerprint sensor and at least one touch sensor.

The 1-1 flexible printed circuit board FPC1 includes a first fingerprint-touch IC FT_IC1 connected to the first and second touch wires TW1 and TW2 and the first fingerprint wires FxW1 to FxW6 of the first fingerprint sensor FS1 through a plurality of flexible fingerprint-touch wires. The 1-2 flexible printed circuit board FPC2 includes a second fingerprint-touch IC FT_IC2 connected to the third touch wire TW3 and the first fingerprint wires FxW1 to FxW6 of the second fingerprint sensor FS2 through a plurality of flexible fingerprint-touch wires. The 1-3 flexible printed circuit board FPC3 includes a third fingerprint-touch IC FT_IC3 connected to the fourth touch wire TW4 and the first fingerprint wires FxW1 to FxW6 of the third fingerprint sensor FS3 through a plurality of flexible fingerprint-touch wires.

The second flexible printed circuit board FPC2 includes a touch IC T_IC connected to the routing wires RW through a plurality of flexible routing wires.

The sensor screen according to the fifth embodiment of the invention can more simply perform an operation for the fingerprint recognition and also can perform other additional functions using the touch sensor by alternately disposing the plurality of fingerprint sensors and the plurality of touch sensors in the first bezel area, in addition to the effect of being obtained from the sensor screen according to the first embodiment of the invention.

Further, the sensor screen according to the fifth embodiment of the invention can perform other additional functions through the touch sensor and the touch array by forming at least one touch sensor in a portion of the first bezel area BA, in which the fingerprint sensor is not formed, and forming the touch array in the first active area AA.

Figure 6:
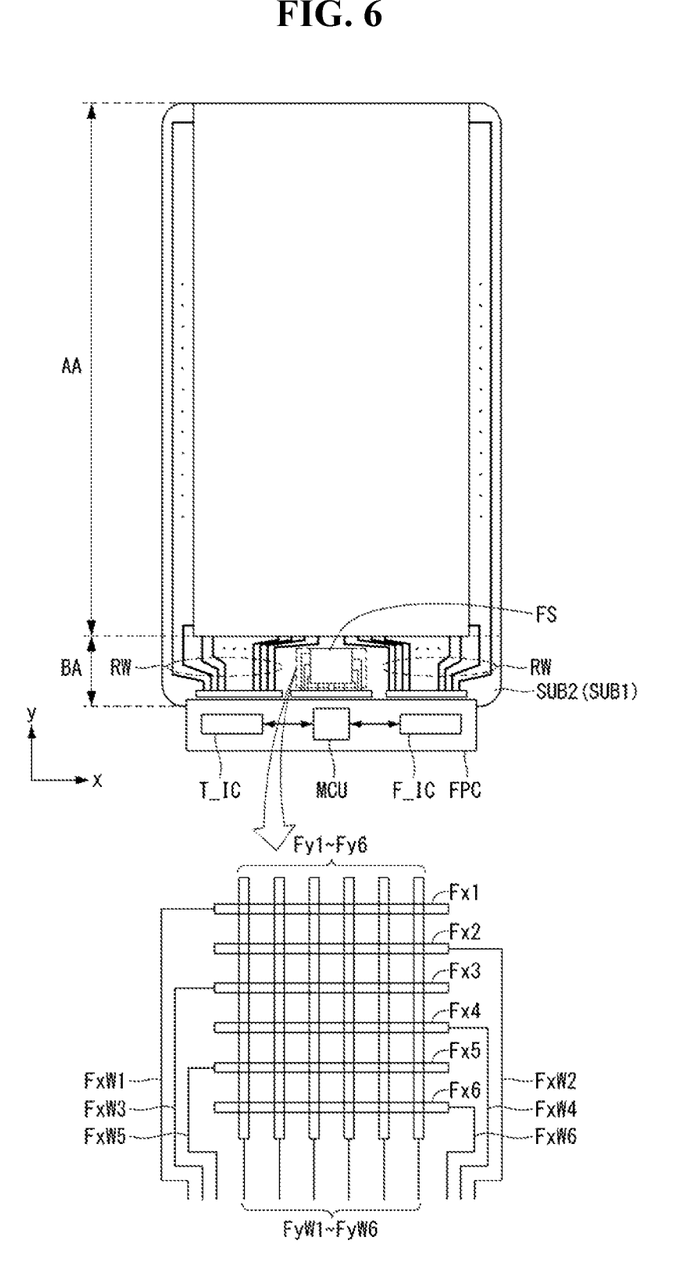
FIG. 6 is a plan view illustrating a sensor screen according to a sixth embodiment of the invention.

Next, a sensor screen according to a sixth embodiment of the invention is described with reference to FIG. 6. FIG. 6 is a plan view illustrating a sensor screen according to the sixth embodiment of the invention.

Referring to FIG. 6, the sensor screen according to the sixth embodiment of the invention is substantially the same as the sensor screen according to the first embodiment of the invention, except that a touch array is disposed in a first active area, and a fingerprint IC, a touch IC, and a controller are disposed in a flexible printed circuit board. Therefore, the repeated description is omitted, and only a configuration of the sixth embodiment of the invention different from the first embodiment of the invention is described.

A touch array TA is disposed in a first active area AA. The touch array TA includes a plurality of touch electrodes for the touch sensing. The touch array TA may be configured as well-known mutual capacitive touch electrodes or well-known self-capacitive touch electrodes.

A fingerprint sensor FS, 1-1 fingerprint wires FxW1, FxW3, and FxW5 respectively connected to respective one ends of odd-numbered first fingerprint electrodes Fx1, Fx3, and Fx5 of the fingerprint sensor FS, 1-2 fingerprint wires FxW2, FxW4, and FxW6 respectively connected to the other ends of even-numbered first fingerprint electrodes Fx2, Fx4, and Fx6 of the fingerprint sensor FS, and second fingerprint wires FyW1 to FyW6 respectively connected to second fingerprint electrodes Fy1 to Fy6 of the fingerprint sensor FS are disposed at one side of a first bezel area BA.

Routing wires RW connected to the touch electrodes of the touch array TA are disposed in the first bezel area BA.

A flexible printed circuit board FPC is disposed at one end of the first bezel area BA. The flexible printed circuit board FPC includes a fingerprint IC F_IC connected to the first and second fingerprint wires FxW1 to FxW6 and FyW1 to FyW6 through a plurality of flexible fingerprint wires, a touch IC T_IC connected to the routing wires RW through a plurality of flexible routing wires, and a controller MCU which is connected to the fingerprint IC F_IC and the touch IC T_IC and controls the fingerprint IC F_IC and the touch IC T_IC.

Because the sensor screen according to the sixth embodiment of the invention forms at least one touch sensor in a portion of the first bezel area BA, in which the fingerprint sensor is not formed, and forms the touch array in the first active area AA, the sensor screen according to the sixth embodiment of the invention can perform other additional functions through the touch sensor and the touch array, in addition to the effect capable of being obtained from the sensor screen according to the first embodiment of the invention.

Further, the sensor screen according to the sixth embodiment of the invention can save the space and can easily perform the wiring design by forming the fingerprint IC F_IC for processing the fingerprint recognition, the touch IC T_IC for processing the touch recognition, and the controller MCU for controlling the fingerprint IC F_IC and the touch IC T_IC in the flexible printed circuit board FPC.

Figure 7:
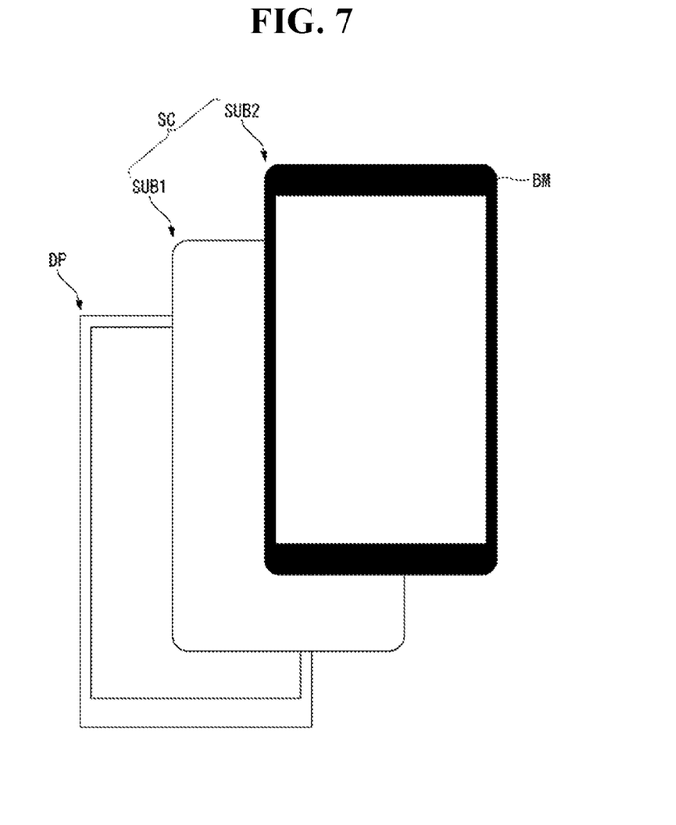
FIG. 7 is an exploded perspective view schematically illustrating a display device, to which the sensor screen according to the first to sixth embodiments of the invention is applied.
Figure 8:
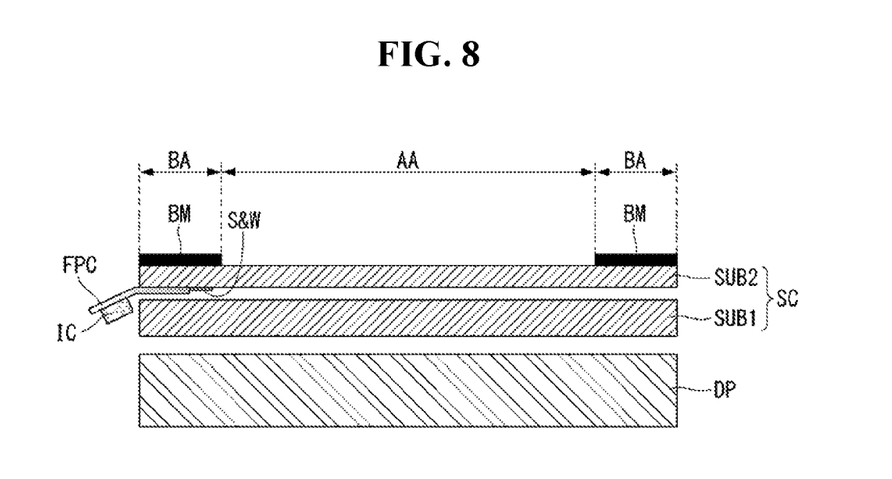
FIG. 8 is a cross-sectional view schematically illustrating an example of a display device, to which the sensor screen according to the first to sixth embodiments of the invention is applied.
Figure 9:
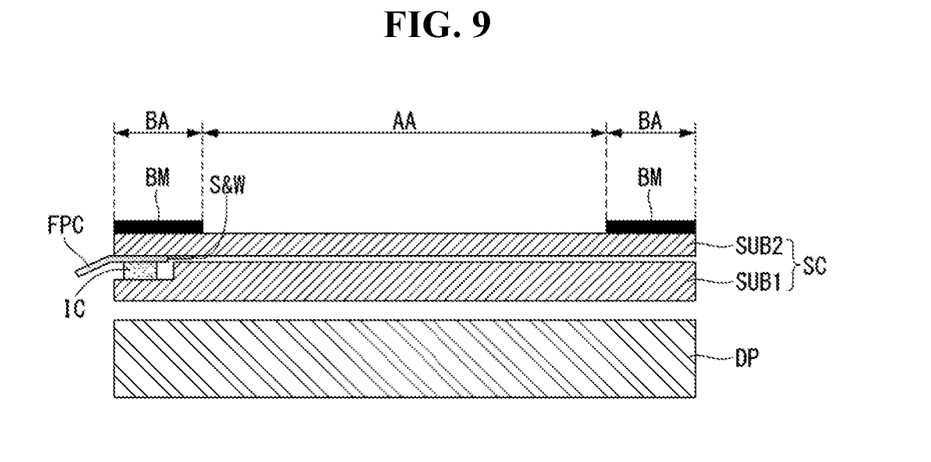
FIG. 9 is a cross-sectional view schematically illustrating another example of a display device, to which the sensor screen according to the first to sixth embodiments of the invention is applied.
Figure 10:
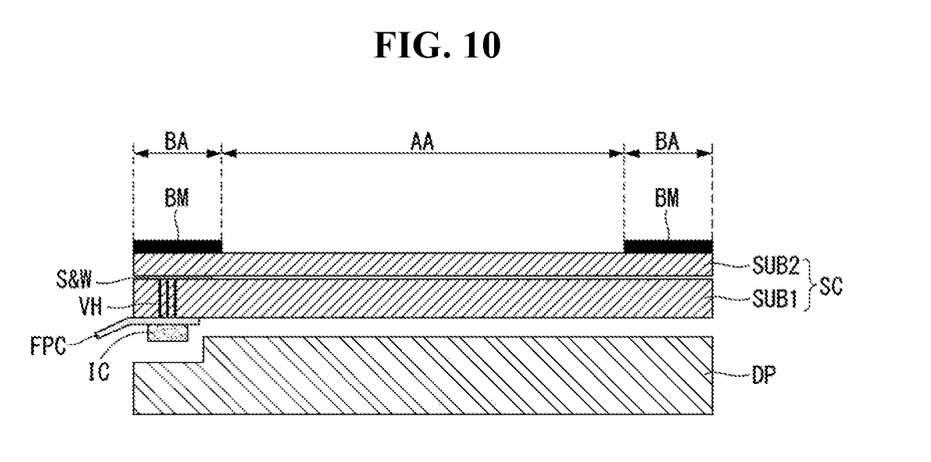
FIG. 10 is a cross-sectional view schematically illustrating another example of a display device, to which the sensor screen according to the first to sixth embodiments of the invention is applied.

Next, various examples of a display device, to which the sensor screen according to the first to sixth embodiments of the invention is applied, are described with reference to FIGS. 7 to 10. All the components of the display device according to all embodiments of the invention are operatively coupled and configured. FIG. 7 is an exploded perspective view schematically illustrating an example of a display device, to which the sensor screen according to the first to sixth embodiments of the invention is coupled with a display panel. FIG. 8 is a cross-sectional view schematically illustrating an example of a display device, to which the sensor screen according to the first to sixth embodiments of the invention is applied. FIG. 9 is a cross-sectional view schematically illustrating another example of a display device, to which the sensor screen according to the first to sixth embodiments of the invention is applied. FIG. 10 is a cross-sectional view schematically illustrating another example of a display device, to which the sensor screen according to the first to sixth embodiments of the invention is applied.

Referring to FIGS. 7 to 10, a sensor screen SC according to the first to sixth embodiments of the invention may be disposed on a display panel DP of a display device. The display panel DP may use a panel of a flat panel display, such as a liquid crystal display (LCD), an organic light emitting diode (OLED) display, a field emission display (FED), and a plasma display panel (PDP).

Each of first and second base members SUB1 and SUB2 of the sensor screen SC includes a first active area AA and a first bezel area BA. The first active area AA of the sensor screen SC corresponds to a second active area AA of the display panel DP, on which an image is displayed. The first bezel area BA of the sensor screen SC corresponds to a second bezel area BA of the display panel DP disposed outside the second active area AA.

The sensor screen SC includes a fingerprint sensor FS or a fingerprint-touch sensor FTS disposed in the first active area AA of one surface of one of the first and second base members SUB1 and SUB2 which are positioned opposite each other. The first and second base members SUB1 and SUB2 may be attached to each other using a transparent material having an excellent adhesive strength and excellent weatherability, for example, an optical clear adhesive (OCA) or an optical clear resin (OCR). Further, the first and second base members SUB1 and SUB2 may be attached to the display panel DP using the OCA or the OCR.

The second base member SUB2 may include a black matrix BM, which is disposed in the first bezel area BA of the second base member SUB2 and surrounds the first active area AA, so as to prevent a loss of a transmittance when the second base member SUB2 is attached to the display panel DP.

FIG. 8 illustrates an example of the display device, in which the fingerprint sensor, the touch sensor, and the wires according to the first to sixth embodiments of the invention are disposed on the lower surface of the second base member SUB2. FIG. 8 illustrates that the IC including the fingerprint IC, the touch IC, etc. is disposed outside the first bezel area BA, as an example. However, the IC may be disposed in the first bezel area BA.

FIG. 9 illustrates an example of the display device, in which the fingerprint sensor, the touch sensor, and the wires according to the first to sixth embodiments of the invention are disposed on the upper surface of the first base member SUB1. As shown in FIG. 9, the first base member SUB1 may include a groove receiving the IC including the fingerprint IC, the touch IC, etc. Further, because the IC may be received in the groove of the first base member SUB1, the display device of FIG. 9 can prevent a problem resulting from the protrusion of the IC when the IC is disposed in the first bezel area BA.

FIG. 10 illustrates an example of the display device, in which the fingerprint sensor, the touch sensor, and the wires according to the first to sixth embodiments of the invention are disposed on the upper surface of the first base member SUB1, and the flexible printed circuit board FPC, on which the IC including the fingerprint IC, the touch IC, etc. is mounted, is disposed on the lower surface of the first base member SUB1. In the display device of FIG. 10, the first base member SUB1 may have via holes VH, so that the fingerprint wires and the touch wires connected to the fingerprint IC and the touch IC extend from the upper surface to the lower surface of the first base member SUB1. In the display device of FIG. 10, because the IC may be received in a stepped portion of the display panel DP, the problem resulting from the protrusion of the IC can be prevented.

Although embodiments have been described with reference to a number of illustrative embodiments thereof, it should be understood that numerous other modifications and embodiments can be devised by those skilled in the art that will fall within the scope of the principles of this disclosure. For example, in the embodiments of the invention, the fingerprint electrodes, the touch electrodes, the fingerprint IC, the fingerprint-touch IC, the flexible printed circuit board, the various wires may be variously changed in number. Further, the embodiments of the invention describe that the fingerprint sensor or the touch sensor is connected to the fingerprint IC or the touch IC using the flexible printed circuit board, but are not limited thereto. The fingerprint sensor or the touch sensor may be connected to the fingerprint IC or the touch IC through COF (chip-on film) or LOG (line-on glass). Thus, various variations and modifications are possible in the component parts and/or arrangements of the subject combination arrangement within the scope of the disclosure, the drawings and the appended claims.

What is claimed is:

1. A sensor screen comprising:
 a first base member including a first active area and a first bezel area, and having a first thickness;
 a second base member positioned opposite the first base member, and having a second thickness less than the first thickness; and
 at least one fingerprint sensor disposed in a portion of the first bezel area of one of the first and second base members which are positioned opposite each other,
 the at least one fingerprint sensor including a plurality of first fingerprint electrodes arranged in a first direction and a plurality of second fingerprint electrodes, which are insulated from the plurality of first fingerprint electrodes and are arranged in a second direction crossing the first direction.

2. The sensor screen of claim 1, further comprising a first flexible printed circuit board disposed at one edge of the first bezel area adjacent to the portion of the first bezel area, the first flexible printed circuit board including a fingerprint integrated circuit (IC) connected to ends of the plurality of first and second fingerprint electrodes.

3. The sensor screen of claim 2, wherein a touch array including a plurality of touch electrodes is disposed in the first active area.

4. The sensor screen of claim 3, further comprising a second flexible printed circuit board disposed at the other edge opposite the one edge of the first bezel area, the second flexible printed circuit board including a touch IC connected to ends of the plurality of touch electrodes.

5. The sensor screen of claim 2, wherein the first base member further includes a groove receiving the fingerprint IC.

6. The sensor screen of claim 2, further comprising at least one touch sensor separated from the at least one fingerprint sensor in the portion of the first bezel area.

7. The sensor screen of claim 6, wherein at least one flexible printed circuit board is disposed at one edge of the first bezel area adjacent to the portion of the first bezel area, and a fingerprint-touch integrated circuit (IC) connected to ends of the plurality of first and second fingerprint electrodes is mounted on the at least one flexible printed circuit board.

8. The sensor screen of claim 1, wherein a plurality of via holes are disposed at one side of the first base member, a plurality of first fingerprint wires connected to the plurality of first fingerprint electrodes and a plurality of second fingerprint wires connected to the plurality of second fingerprint electrodes passing through the plurality of via holes, and wherein a fingerprint integrated circuit (IC) connected to the plurality of first and second fingerprint wires is disposed on another surface of the first base member opposite one surface of the first base member, which faces the second base member.

9. A display comprising:
a display panel including an active area in which an image is displayed, and a bezel area disposed outside the active area; and
the sensor screen of claim 1 disposed on the display panel,
wherein the first base member is disposed on the display panel, and
wherein the portion of the first bezel area, in which the at least one fingerprint sensor is disposed, corresponds to the bezel area of the display panel.

10. The display of claim 9, wherein the second base member is adjacent to the first base member.

11. The display of claim 9, wherein the first active area and the first bezel area of the first base member have the first thickness.

12. The sensor screen of claim 1, wherein the second base member is adjacent to the first base member.

13. The sensor screen of claim 1, wherein the first active area and the first bezel area of the first base member have the first thickness.

14. A sensor screen comprising:
a first base member including a first active area and a first bezel area, and having a first thickness;
a second base member positioned opposite the first base member, and having a second thickness less than the first thickness;
at least one fingerprint sensor disposed in a portion of the first active area of one of the first and second base members which are positioned opposite each other, the at least one fingerprint sensor including a plurality of first fingerprint electrodes arranged in a first direction and a plurality of second fingerprint electrodes, which are insulated from the plurality of first fingerprint electrodes and are arranged in a second direction crossing the first direction; and
at least one touch sensor configured to alternate with the at least one fingerprint sensor in the portion of the first active area.

15. The sensor screen of claim 14, wherein the second base member is adjacent to the first base member.

16. The sensor screen of claim 14, wherein the first active area and the first bezel area of the first base member have the first thickness.

* * * * *